(12) United States Patent
Sher et al.

(10) Patent No.: US 6,203,885 B1
(45) Date of Patent: Mar. 20, 2001

(54) CLING FILMS HAVING A MICROREPLICATED TOPOGRAPHY AND METHODS OF MAKING AND USING SAME

(75) Inventors: Frank T. Sher, St. Paul; Francis V. Loncar, Jr., St. Joseph Township, St. Croix County, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/098,961

(22) Filed: Jun. 18, 1998

(51) Int. Cl.⁷ ............................................. B32B 3/00
(52) U.S. Cl. .................................. 428/156; 428/167
(58) Field of Search ............................ 428/156, 167, 428/141, 188, 213

(56) References Cited

U.S. PATENT DOCUMENTS

| | | |
|---|---|---|
| 4,023,570 | 5/1977 | Chinai et al. ............... 128/290 R |
| 4,397,905 | 8/1983 | Dettmer et al. ................. 428/180 |
| 4,861,635 | 8/1989 | Carpenter et al. ................ 428/40 |
| 4,968,562 | 11/1990 | Delgado .......................... 428/402 |
| 4,994,322 | 2/1991 | Delgado et al. ................. 428/343 |
| 5,141,790 | 8/1992 | Calhoun et al. .................. 428/40 |
| 5,268,228 | 12/1993 | Orr .................................. 428/343 |
| 5,296,277 | 3/1994 | Wilson et al. ..................... 428/40 |
| 5,298,791 | 3/1994 | Liberty et al. ................... 257/707 |
| 5,362,516 | 11/1994 | Wilson et al. ................. 427/207.1 |
| 5,437,754 | 8/1995 | Calhoun .......................... 156/231 |
| 5,449,540 | 9/1995 | Calhoun et al. ................... 428/42 |
| 5,462,765 | 10/1995 | Calhoun et al. ................. 427/198 |
| 5,643,668 | 7/1997 | Calhoun et al. ................. 428/354 |
| 5,650,215 | 7/1997 | Mazurek et al. ................. 428/156 |
| 5,689,940 | * 11/1997 | Weder ............................... 53/475 |
| 5,795,636 | 8/1998 | Keller et al. .................. 428/40.01 |
| 5,800,919 | 9/1998 | Peacock et al. ............. 428/355 AC |
| 5,888,615 | * 3/1999 | Mascarenhas et al. ............ 428/141 |

FOREIGN PATENT DOCUMENTS

| | | | |
|---|---|---|---|
| 0 313 766 | 5/1989 | (EP) | ............... A41B/13/02 |
| 0 459 059 A2 | 12/1991 | (EP) | ................. C09J/7/02 |
| 0 580 981 B1 | 2/1994 | (EP) | . |
| 1 511 060 | 5/1978 | (JP) | ................. B32B/3/30 |
| 7-138541 | 5/1995 | (JP) | ................. C09J/7/02 |
| 7-090231 | 4/1996 | (JP) | . |
| WO 94/02231 | 2/1994 | (WO) | ......... B01D/35/143 |
| WO 96/15715 | 5/1996 | (WO) | ........... A61B/5/0408 |
| WO 97/31076 | 8/1997 | (WO) | ........... C09J/133/08 |
| WO 98/29231 | 7/1998 | (WO) | ........... B29C/59/02 |
| WO 98/29516 | 7/1998 | (WO) | ................. C09J/7/02 |

OTHER PUBLICATIONS

Patent Abstracts of Japan—07090231; Title—Tacky Adhesive Sheet.

Patent Abstracts of Japan—06212131; Title–Easy–to–Release Decorative pressure–Sensitive Adhesive Sheet, Its Production and Its Application.

Patent Abstracts of Japan—08100155; Title–Double Bond Tape And Production of Double Bond Tape.

* cited by examiner

Primary Examiner—Donald Loney
(74) Attorney, Agent, or Firm—Dale A. Bjorkman

(57) ABSTRACT

Films having a microreplicated topography are prepared from contacting a microembossed pattern to a layer of film. When an adhesion interface is established between the layer of film and a supporting substrate, the topography of the film surface controls the performance of the adhesion interface. Articles having microreplicated film surfaces are also disclosed that have an advantage of providing microchannels for fluid egress for an effective period of time. Multiple microembossed patterns produce microreplicated film surfaces having both microchannels for fluid egress and pegs for improved film properties.

10 Claims, 1 Drawing Sheet

CLING FILMS HAVING A MICROREPLICATED TOPOGRAPHY AND METHODS OF MAKING AND USING SAME

FIELD OF INVENTION

This invention relates to cling film having a controlled topographical surface of microchannels and the methods of making and using them.

BACKGROUND OF INVENTION

Cling film, also known as static cling film, is applied to windows and smooth surfaces for temporary use as signage or other functional applications such as sun shade films. The natural adhesion of the smooth flexible film can provide sufficient holding power while still allowing easy removal. During application, the contact of the film surface with substrate results in instantaneous adhesion. Attempts to achieve uniform contact over the entire smooth surface often result in entrapment of air bubbles and large air pockets, which are not easily pressed out.

Anyone who has ever attempted to hang wallpaper can appreciate the frustration that can arise when entrapped air beneath a film can not be removed easily. The most common solutions to this problem are to remove and reapply the film or to perforate the film to release the entrapped air. Multiple attempts to adhere the same film to a substrate can compromise its appearance or increase the probability of uneven or misaligned film on the substrate. Perforating a film mars its appearance. The removal of air bubbles is also labor intensive.

For cling films, prior common solutions to this problem are to remove and reapply the film, which can contaminate the film. Any attempt to press out some of the air bubbles usually has limited effectiveness. Another solution to the problem is to wet the substrate or the film before application, which tends to cause the film to slide on vertical surfaces even if the messiness of the application is deemed acceptable. One might think that a substrate can be textured to permit egress of fluids during film application, but that textured surface may not have enough contact area for the cling film to cling for the desired period of time. So, there are no good solutions to this problem in the art.

SUMMARY OF THE INVENTION

The problems in the art of cling film construction and application are solved by the present invention through the addition of an engineered topography to one major surface of the film.

Desirably, the addition of topography to a surface of cling film should take the following factors into consideration:

(1) A cling film without channels provides no effective route for egress of fluids in the X-Y dimensions of the interface between the film and the substrate, especially if the film is fluid-impermeable. But if the channels are too large, a path of fluid egress could also be a path of passive ingress of the same or other fluids.

(2) The film, and especially its outer imagable surface, can not be adversely affected by the topography chosen, thereby limiting the size of the channels in the film and also limiting the method of construction. The film needs at least one flat, uniform surface for imaging and other aesthetic reasons. The formation of large channels into the opposing major surface of the film will adversely disrupt the flat, uniform surface of the film used for imaging. Also, topographies that are too large will create undesired undulations or other imperfections in the appearance of the film on the final substrate. Such undulations or other imperfections make the image graphic unacceptable for most commercial markets, even in the inexpensive cling film market.

(3) The area of cling film actually contacting the substrate and the holding power (e.g.., shear and peel clinging) of the cling film affect bonding performance of the film to the substrate. If either the holding power is too weak or the area of the film contact is too small, or both, the performance of the cling film to adhere without the use of adhesive is entirely inadequate. Where there is film contact with the substrate, the nature of contact should be substantially flat.

While the air bubble and fluid egress problems associated with large format graphics are easy to understand, these problems also exist for small graphics and decals where speed of application are significant for economic or manufacturing considerations.

The problem of fluid egress is even more acute whenever the film effectively inhibits any egress in the Z axis.

The art clearly needs a different approach to make cling film easy, fast, and uniform to apply to substrates in a manner that controls fluid egress within the three enumerated factors stated above. Indeed, the art needs to engineer the geometry of the film surface to provide a controlled topography at any film-substrate interface where particular performance is required. Moreover, the art needs to make a cling film that controls fluid egress without harming the essential performance of the film clinging to the substrate for the desired period of time.

The present invention solves the problem of entrapped air between cling film and a substrate such as glass by incorporating micro-channeled topography on the mounting surface of the cling film. The topography can be imparted during manufacture by known embossing, casting, or coating microreplication methods. When the relatively planar cling surface is contacted to the substrate, the small channels allow the egress of air or other fluid. Moreover, the small channels do not adversely affect the essential performance of the film to cling to the substrate.

Preferably, the pattern chosen for creating the microchannels can be square, diamond, hexagonal, or parallel with shapes being any of rounded, triangular, trapezoidal, or rectangular. Sizes of the pattern depends on the thickness of the cling film and can be as small as less about 0.1 mm wide and less than 25 $\mu$m deep to offer flexible performance design. The total area of micro-channels can be controlled such that a substantial portion of the cling vinyl would remain relatively unchanged to provide sufficient bonding surface.

For this invention, that particular performance should include the provision for fluid egress in the X-Y dimensions of the film-substrate interface but without adversely affecting the desired appearance of the outer imageable surface which should remain flat and uniform for imaging. Further, fluid egress should be balanced against "clinging" bond strength for maintaining the interface, i.e., assuring the film will continue to cling to the glass.

One aspect of the present invention provides a means of controlling the topography of a cling film surface, comprising contacting a microembossed pattern to a major surface of the cling film and forming a microreplicated surface, such that when an interface is established between the film and a supporting substrate, the topography of the film surface controls the performance of the interface between that film and the supporting substrate.

"Cling film" means any form of polymeric film that has sufficient properties on at least one major surface thereof, at the time of application to a supporting substrate, to cling by application of static interaction to that substrate without the application of an adhesive between the film and the substrate.

Another aspect of the present invention provides a microreplicated film surface formed by microreplication from any contacting technique such as casting, coating, or compressing techniques. Microreplication can be achieved by at least any of (1) casting or extruding using a tool having a microembossed pattern, (2) coating of a film onto a release liner having that microembossed pattern, or (3) passing through a nip roll to compress the film against a release liner having that microembossed pattern. Desired embossing topography can be formed in tools via any of a number of well-known techniques, selected depending in part upon the tool material and features of the desired topography. Illustrative techniques include etching (e.g., via chemical etching, mechanical etching, or other ablative means such as laser ablation or reactive ion etching, etc.), photolithography, stereolithography, micromachining, knurling (e.g., cutting knurling or acid enhanced knurling), scoring or cutting, etc.

The microreplicated topography resides on at least one major surface of the film and can optionally reside on both major, opposing surfaces of the film affecting the properties of the interface(s) in the same or different manners, as desired by those skilled in the art.

When a microembossed liner is used, the liner can be a release liner (e.g., a releasable storage liner for the adhesive or a transfer liner for moving the film from one location to another) or a tape backing on a self-wound roll that also serves as a liner, such that the microembossed surface of the tape backing microreplicates the surface of the film exposed as the tape is unwound.

"Microembossed" means a topography on the liner or the casting tooling having an effective three-dimensional pattern that generates a depth less than the thickness of the continuous film. The pattern can be interconnected or continuously parallel.

"Interconnected" means that at least two three-dimensional features in the microembossed pattern intersect causing the microreplicated formation of an intersection of the inverse of such three-dimensional features in the film surface. "Microreplicated film" means film having a topography in at least one major, substantially continuous surface that is essentially, but not necessarily perfectly, the inverse of the microembossed pattern to which the film surface is contacted and has a contact area of at least about 35%.

"Pattern" means any formation of embossings that can utilize any theory of geometry, including without limitation, Euclidian geometry and fractal geometry.

Optionally, the microembossed patterns can be multiple. "Multiple" means two or more embossing patterns are superimposed on the tool or liner to create a complex pattern of differing depths or heights of embossing to form the microreplicated film having a complex pattern of differing depths or heights.

Another aspect of the present invention is an article having a microreplicated cling film of the present invention.

The microembossed liners, tools, or nip rolls used to make microreplicated film of the present invention can provide a vast array of microreplication combinations given the multitude of microembossed patterns, the multiplicity of embossings, and the variety of materials available.

A feature of microreplicated films of the present invention is that the microembossed pattern is retained for an effective period of time on the microreplicated film during intended use. The retention of microreplication can range from minutes to years depending upon the rheology of the film chosen and the conditions of application. Fluid egress may only be desired for limited times.

The invention not only provides a three-dimensional topography for films, but because of the unusual properties of cling vinyl materials, their flow characteristics can be engineered. Therefore, the invention also contemplates the effective use of the polymer chemistry and substrate application techniques to control the fourth dimension, how long after substrate application the surface of the film remains three-dimensional. The topography need not be permanent. For example, it can be desired to collapse any portion of the film-substrate interface after sufficient fluid egress is completed.

Another feature of the microreplicated adhesive topography is the ability to control the engineering of the interface for desired uses, such as air bleeding from large image graphics, plasticizer migration routes from plastic materials, and other applications that require fluid transport in the X-Y dimensions of the interface(s) rather than the Z axis from the surface of the adhesive. In other words, aerodynamics of the film interface can be engineered as required.

An optional feature of the microreplicated film, when using multiple microembossed patterns, is the ability to control the types of materials introduced into recesses of differing depths in the topography for complex film usages, such as positionability of adhesives as that disclosed in U.S. Pat. Nos. 5,296,277 and 5,362,516 (both Wilson et al.) and 5,141,790 (Calhoun et al.) and U.S. Pat. application Ser. No. 08/559,037 (Keller et al.) filed Nov. 15, 1995, the disclosures of which are incorporated by reference therein.

An advantage of the present invention is the creation of an engineered cling film surface that serves specific intended uses for a controlled period of time when transferred or adhered to another material.

Another advantage of the present invention is a cling film that provides effective fluid egress without adversely affecting its appearance when clinging onto the substrate.

Another advantage of the present invention is the ability of the film surface(s) to exhaust fluids such as gases, entrapped air, plasticizers, or moisture from the plane of the adhesive surface independent of specialized compositions or formulations of the film.

Another advantage of the present invention is the formation of the same or different adhesive topographies to each of the opposing major surfaces of the film for performance and decorative reasons, or both. For example, one film interface could provide plasticizer migration from one engineered topography and the opposing major surface could provide fluid egress from a second engineered topography.

Another advantage of the present invention is the ability of the film surface(s) to permit controlled ingress of fluids at a desired time to affect the interface(s), such as to facilitate removal, alter surface characteristics, provide additional remedial treatments, and the like.

Other features and advantages will become apparent from the embodiments of the invention described below in relation to the Figure.

EMBODIMENTS OF INVENTION

Figure 1:
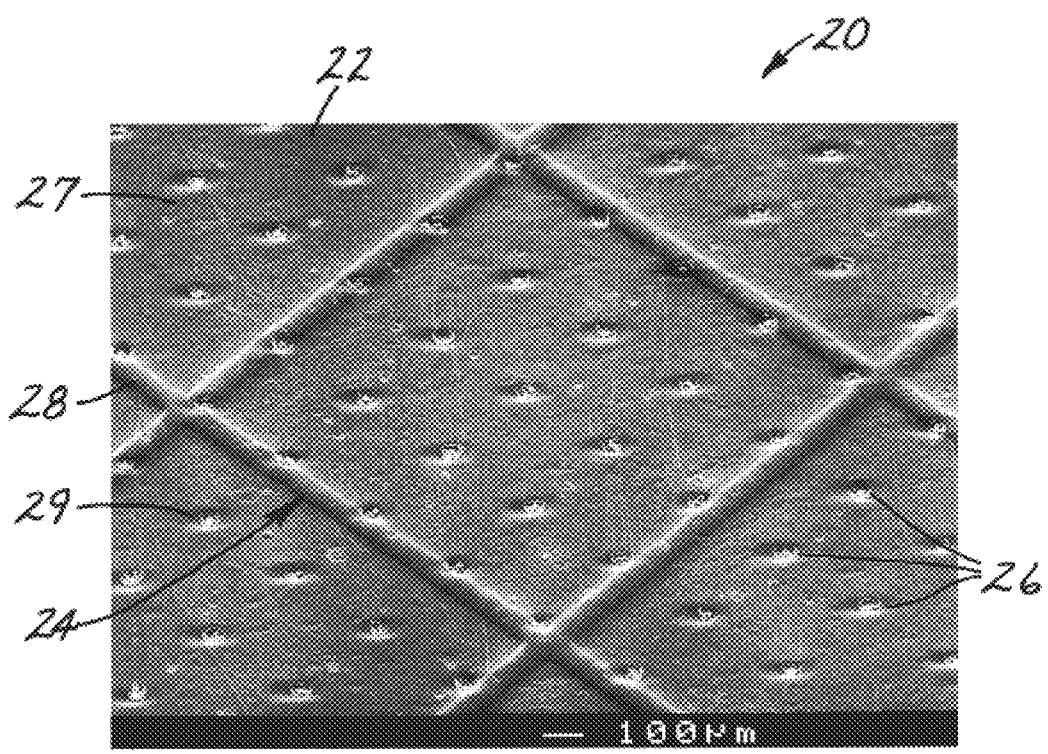
FIG. 1 is a scanning electron micrograph of a double microembossed liner or tool that has been used to make a film surface of the present invention.

The application of patterns to surface(s) of cling film can employ the disclosures of copending, coassigned, U.S. patent application Ser. No. 08/775,844 (Sher et al.) and copending, coassigned, U.S. patent application Ser. No. 08/775,736 (Calhoun et al.), now U.S. Pat. No. 5,897,930 both of which applications are incorporated by reference herein as if fully rewritten.

FIG. 1 shows an example of the complex topography that can be created on liners or a tool. This scanning electron micrograph shows a planar or cylindrical tool 20 having a surface 22 with one pattern 24 of embossings and optionally a second pattern 26 of embossings. Planar tools can be used in a batch embossing process; cylindrical tools (e.g., belts or drums) can be used in a continuous embossing process. The film can be cast onto this tool. Alternatively, the inverse of this pattern can be created on a liner that then is used for casting of the film. Either way, the film surface can have an engineered and controlled topography.

A careful viewing of FIG. 1 shows pattern 24 comprising both relatively planar lands 27, i.e., large squares that have been depressed from the initial surface 22 of tool 20 and a series of ridges 28 formed from the material moved from the lands 27 during the embossing process. Pattern 26 forms an array of depressions 29.

If multiple embossing patterns are desired, the manufacturing process reverses the order of embossings, with the required pattern(s) coming last. The manufacturing of the double embossed tool 20 actually requires the formation of the second embossing pattern 26 first, followed by the formation of the required first embossing pattern 24, second. Between the time of making the two embossing patterns, a desired material can be introduced into optional second embossing pattern 26, such as glass beads, in a manner as disclosed in U.S. Pat. No. 5,296,277 (Wilson et al.), incorporated by reference herein.

The resulting multiple microembossed tool 20 has a total area "T", a first area "A" for lands 27 created during embossing of pattern 24, and an area "B" for ridges 28 created during embossing of pattern 24, and an area "C" for depressions 29 residing in both lands 27 and ridges 28. Thus, T=A+B and all of area C resides within either area A or B, or both.

The patterns 24 and 26 can be varied according to requirements in the art recognizing that the patterns are superimposed on one another. For example, in FIG. 1, lands 27 are discontinuous, because separate projections on the tooling for forming pattern 24 do not intersect with one another. Likewise, depressions 29 are discontinuous because separate projections on the tooling for forming pattern 26 do not intersect with one another.

The result of pattern 24 creates separated lands 27 from one another, and the result of pattern 26 creates separated depressions 29 from one another. The interconnected ridges 28 are a by-product of the embossing of separated lands 27.

The topography of the tool(s) used to create is an obverse image of the final topography of the microreplicated film surface, with the tool 20 serving as the inverse image for transferring the image of the tool(s) to the microreplicated film. Therefore, the topography(ies) of the embossing tool(s) for tool 20 is essentially the topography of the microreplicated film.

When the embossing is performed directly on the film, the topography of the embossing tool(s) is the inverse image of the topography of the film.

As seen in FIG. 1, for the embodiment of film to be produced from patterns 24 and 26, the percentage area of lands 27 to surface 22 (A to T) can range from about 35% to about 99%. Desirably, the percentage can range from about 50% to about 98%. Preferably, the percentage can range from about 60% to about 97%. More preferably, the percentage can range from about 70% to about 96%. Most preferably, the percentage of A to T can range from about 85% to about 95% to provide adequate fluid egress without adversely affecting adhesion to the supporting substrate. In other words, the percentage of A to T essentially determines contact area for the microreplicated film on the supporting substrate. The percentage areas, respectively, of interconnected ridges 28 to surface 22 (B to T) are the remainders, respectively. Operating within the percentages described in this paragraph does not harm the ability of the cling film to cling to the substrate if the polymer for the cling film is properly chosen.

The percentage area of depressions 29 to surface 22 (C to T) can range from about 1% to about 70%. Preferably, the percentage can range from about 2% to about 25%. Most preferably, the percentage of C to T can range from about 3% to about 15%.

These percentages expressed with respect to the tool 20 cause approximately the same percentages on the inverted topography of the microreplicated film. However, the present invention is not limited by these percentages concerning the area of depressions 29 when creating the volume of depressions 29 or the geometry used to achieve those depressions. In other words, the depressions 29 can assume any solid geometric desired by those skilled in the art, within the percentage areas expressed above.

The embossing of pattern 24 to create lands 27 moves material into ridges 28. Like the formation of mountains from the movement of large land masses, ridges 28 rise from surface 22. While the depth of embossing of lands only results in a depth of a few micrometers, ridges rise from surface 22 to a height ranging range from about 3 to about 75 μm, preferably from about 5 to about 50 μm, and most preferably from about 6 to about 40 μm.

The depth of embossings for optional pattern 26 can range from about 4 to about 200 μm, preferably from about 8 to about 100 μm, and most preferably from about 10 to about 30 μm. Because the embossing of pattern 26 occurs before the embossing of pattern 24, the depths identified here are cumulative effect of both embossings, not necessarily the height of embossing tool.

Moreover, it should be apparent to those skilled in the art that the size of the embossing tooling needed may exceed the depth of embossing desired because of viscoelastic properties of the tool 20 being embossed.

The "sidewalls" of embossings for any of pattern 24, pattern 26, or any combination of them, can be any shape desired, ranging from a constant radius of curvature to any polygonal shape of at least 2 surfaces within the pattern 24 or 26. Nonlimiting examples of shapes of embossing, in cross-section, include curved, rectangular, trapezoidal, triangular, bimodal, and the like. U.S. Pat. No. 5,296,277 (Wilson et al.) describes some of the variables to be considered when forming depressions 29 in order to provide pegs in the microreplicated film.

The width of embossings in any of pattern 24, pattern 26, or any combination of them, can vary as needed. For example, in FIG. 1, the width of embossings that create lands 27 and depressions 29 are relatively uniform for surface 22. However, the pattern can vary across surface 22 for fluid egress, not unlike a tributary-river configuration in a watershed.

For example, to create microchannels for fluid egress, one could use a tool 20 having a pattern 24 creating ridges 28 having a final width at the base, after viscoelastic properties have reached equilibrium, of less than about 400 µm and preferably from about 50 to 200 µm. The ridges 28 in FIG. 1 are about 100 µm wide.

Precision of topographical formation of tool 20 can be achieved using a variety of machining techniques. The machine tool industry is capable of creating tools with any pattern desired by those skilled in the art. Euclidean geometric patterns can be formed with any pattern of size, shape and depth of embossing projection in any number of steps.

Tools can range from planar presses to cylindrical drums to other curvilinear shapes, depending on how it is desired to employ the patterning steps.

Nonlimiting examples of sources of tooling include commercial sources of photolithographic printing plates and cylinders, precision engraved plates and cylinders, laser machined plates and cylinders, and the like.

Films can be selected from a variety of conventional polymeric film formulations to achieve the desired topography of the present invention. With that advantage, film can be imaged using any commercial technique, including electrography, inkjet, screen printing, flexography, electronic cutting, or other imaging or graphic techniques.

Nonlimiting examples of films include polyvinyl chloride films (whether plasticized or flexible), polyurethane films, high density polyethylene films, polypropylene films, biaxially oriented polypropylene films, tackified linear low density polyethylene films, acrylonitrile/butadiene/isoprene films, acrylonitrile/butadiene copolymers, styrene/butadiene copolymers (whether random or block), styrene/isoprene copolymers (whether random or block), styrene/ethylene-butylene block copolymers, and combinations thereof, as well as other films known in the art for making cling films. Chemistry and polymer physics of the film can be used to control the fourth dimension, duration, of three-dimensional microreplicated films of the invention. Understanding the rheology, such as creep compliance, of a film can assist in controlling how quickly or if the microchannels close after application.

Multiple compositions for the film can be employed. Pattern coating of films can be found in PCT Patent Publication WO96/15715 (Yasis et al.), the disclosure of which is incorporated by reference herein.

For example, if one desired to have differential rheological properties on a given film, one could pattern coat film layers, such as concentrically, in order to control how quickly certain portions of the microchannels close. In the tributary-river paradigm, the film pattern coated at the relative interior of the surface could flow more quickly and close off microchannels to fluid ingress while microchannels of the relative perimeter of the surface permit continued "drainage" of fluids from the interior of film interface toward the perimeter.

If a tool 20 is used, it can be any metallic or polymeric plate or cylinder or belt known to those skilled in the art of embossing microreplicated patterns.

If a liner is used, the liner can be any release or transfer liner known to those skilled in the art for use with films and that is capable of being microembossed. Nonlimiting examples of liners include a variety of commercial materials from 3M of St. Paul, Minn. and other commercial manufacturers of liner products such as Rexam Release Corporation of Oakbrook, Ill. or Daubert Coated Products of Westchester, Ill. Such liners are typically polyethylene coated papers with commercial silicone release coatings; polyethylene coated poly(ethylene terephthalate) films with commercial silicone release coatings; or cast polyolefin films which can be embossed with pattern(s) while making such films, and thereafter coated with commercial silicone release coatings. Additional useful liners are identified in the Calhoun et al. and Wilson et al. patents.

Alternatively, both major surfaces of film can be microreplicated using the same or different tool(s) 20 to provide the same or different film performance properties at the two different film interfaces during use.

For example, different types of fluid egress can be desired from the different film interfaces: namely, gaseous egress at one interface and liquidic egress at the other.

USEFULNESS OF THE INVENTION

Image graphic films are unexpectedly improved by the microreplicated film surfaces of the present invention. Image graphic films having film surfaces of the present invention can be used to ensure fluid egress for a predetermined period of time according to the rheology of the films (creep compliance, modulus, etc.).

For example, one skilled in the art can control fluid egress but minimize fluid ingress at the film interface by (a) selecting a suitable film and (b) forming a topography according to the present invention, and (c) appropriately applying the film to the supporting substrate. This provides air bleed during installation but afterwards seals the interface between the film and the supporting substrate.

Alternatively, one skilled in the art can select an film having a different rheology to maintain the topography of the film surface for a longer period of time after initial installation to permit multiple reinstallations onto the same or different supporting substrate or to maximize available routes for fluid egress.

Film surfaces of the present invention improve economic value by reducing manufacturing costs, reducing labor costs during installation, and minimizing maintenance required by film interface problems.

Wavefront motion is usually used to apply murals or graphics to a supporting substrate. These graphics benefit from the film topography of the present invention because, surprisingly, the microchannels of the film not only promote fluid egress during film application to the substrate but also survive the application process that involves high transient pressures to provide routes of fluid egress for residual air pockets.

Further features, advantages, and embodiments are described in the examples.

EXAMPLES

1. To 50 g of a plastisol containing about 42 parts of diundecylphthalate plasticizer per hundred parts of polyvinyl chloride (from Geon of Brecksville, Ohio) was added 5 g of Santicizer 711-P plasticizer (from Monsanto of St. Louis, Mo.). The modified plastisol was spread in a thick layer onto an etched magnesium alloy plate having two sets of parallel raised flat ridges intersecting to form a diamond grid pattern. The ridges were 1.27 mm apart on center, 0.15 mm wide at the flat top (filleted with the base), and nominally 50 µm high. The coated plate was placed in a 204° C. oven for 2 minutes, and after cooling, the thick translucent cling film was peeled from the plate. The cling film had a diamond grid array of recessed channels corresponding to the ridges of the plate. The film had partial cling properties.

The film was applied to window glass by hand, and air bubbles and pockets were easily pressed out (by lateral air bleed through the channels).

2. The procedure of Example 1 was followed, except that 10.7 g of Santicizer 711-P plasticizer was added to 47.6 g of the plastisol, and the modified plastisol was coated onto the ridged plate using a #75 Meyer coating rod. A 0.19 mm (7.5 mil) thick translucent film displaying good cling properties was obtained. The topography was examined using a WYKO RST interferometer (WYKO Corporation, Tucson Ariz.) and an optical microscope. The channels were about 0.3 mm wide at the film surface, about 0.15 mm wide at the flat bottoms, and about 45–47 micrometers deep. When loosely applied to window glass such that air pockets were formed (but severe wrinkling of the film was avoided), the air pockets were easily pressed out by lateral air bleed under the film.

3. Example 2 was repeated except, after the first fusing step, an additional layer of plastisol was coated onto the film and fused. This afforded a 0.254 mm (10 mil) thick film. In similar fashion a film was prepared on planar release liner. Application of the micro-channeled cling film by hand onto glass was relatively easy and afforded uniform contact against the glass. The contacted film had uniform, smooth, visually acceptable appearance and excellent cling properties.

Application of the comparison sample was difficult, and entrapped air pockets were formed. The applied comparison sample had many bubbles entrapped.

4. Example 3 was repeated, except the casting plate had two sets of parallel continuous raised ridges intersecting to form a square grid pattern. The ridges, spaced on centers 2.54 mm apart (i.e., 10 lines per inch compared to 20 lpi for the prior examples), were 40 $\mu$m wide at the flat top, flared to a base width of about 85 to 100 $\mu$m, and were 31 $\mu$m high. The fused cling film had one flat side with no microstructure, and the other flat side had two intersecting sets of parallel recessed channels at 10 lines per inch about 30 $\mu$m deep, about 100 $\mu$m wide at the surface, and about 60 $\mu$m wide at the bottom of the channels. The film was draped loosely onto smooth glass and easily pressed flat onto the glass surface without entrapment of air bubbles. Also, any air pockets initially formed by uneven application of the film could easily be pressed flat. The resulting applied film had good even appearance and good cling for application onto vertical surfaces. The film could also be removed and reused without loss of air release properties.

5. A terpolymer consisting of by weight 35% acrylonitrile, 58% butadiene and 7% isoprene, which is identified by the tradename Nipol DN-1201L (Zeon Chemical Co.), was dissolved in methyl ethyl ketone at a concentration of 25% solids by weight. This solution was then coated on a microridged liner, which had ridges embossed into the surface of the liner. The ridges were nominally 18 $\mu$m tall, 90 $\mu$m wide, and were spaced on center 1270 $\mu$m apart. The solution was coated nominally 200 $\mu$m thick in the wet state using a notch bar coater, which was then dried for 10 minutes at 65° C. The resultant polymer film was nominally 50 $\mu$m thick, and had microchannels in the portion of the film contacting the liner. The microchannels were nominally 18 $\mu$m deep, 90 $\mu$m wide and spaced 1270 $\mu$m center-to-center. This film could be adhered to various substrates such as glass, metal or other polymers. The microchannels permitted air to escape during application so as to eliminate any bubbles under the film. The film would either bond permanently or be removable depending on the substrate. This phenomenon is described in more detail in International Publication PCT/US94/02231. The advance over the art is that the addition of the microchannels permits the direct application of the Nipol DN1201-L film without need for a carrier web either in the film or applied to one surface of the film in order to handle the film. This represents a considerable cost savings both in raw materials and manufacturing. Further, the described construction is thinner and more conformable, which permits application to a broader array of surfaces.

6. The film described in Example 5 was printed via the ScotchPrint™ transfer method marketed by Minnesota Mining and Manufacturing Company of St. Paul, Minn., USA. A piece of film on the liner from Example 4 approximately 15 cm by 30 cm was heat laminated with a printed piece of ScotchPrint™ Transfer Media 8601 with the printed side facing the Nipol DN 1201-L film. This construction was fed through a 3M Model C hot laminator at 426 kPa(64 PSI), 96° C. and a feed rate of 45 cm/min. Excellent transfer was obtained. The resultant printed film could be applied to a substrate for a graphic display. No other films or coatings were required to produce this graphic.

7. Example 6 was repeated except the feed rate through the laminator was increased to 300 cm/min. Excellent transfer was obtained.

8. Example 6 was repeated except ScotchPrint™ Transfer Media 8603 was used and the feed rate was increased to 150 cm/min. Excellent transfer was obtained.

9. Example 8 was repeated except the feed rate was increased to 380 cm/min. Good transfer was obtained.

The invention is not limited to the above embodiments. The claims follow.

What is claimed is:

1. An article comprising a layer of cling film having a topography having an effective three-dimensional pattern that generates a depth less than the thickness of the continuous film on a mounting surface of the cling film, said article being capable of, at the time of application to a smooth surface, clinging by application of static interaction to that smooth surface without the application of an adhesive between the article and the smooth surface, wherein said topography provides channels that allow egress of air or other fluid when the cling film is contacted to the smooth surface.

2. The article according to claim 1, wherein the mounting surface has a complex pattern of differing depths or heights.

3. The article of claim 1, wherein different types of materials are introduced into recesses of the mounting surface.

4. The article according to claim 1, further comprising a supporting substrate and an interface between the supporting substrate and the mounting surface, wherein the mounting surface controls fluid egress from the interface.

5. The article of claim 1, wherein the layer further comprises a major, opposing film surface having topography having an effective three dimensional pattern that generates a depth less than the thickness of the continuous film.

6. The article of claim 1, wherein said topography comprises at least two microembossed patterns.

7. The article according to claim 6, wherein the mounting surface has a complex pattern of differing depths or heights.

8. The article according to claim 6, wherein different types of materials are introduced into recesses of differing depths of the multiple microembossed pattern of the mounting surface.

9. The article according to claim 6, further comprising a supporting substrate and an interface between the supporting substrate and the mounting surface, wherein the mounting surface controls fluid egress from the interface.

10. The article according to claim 6, wherein the layer further comprises a major, opposing film surface, having topography having an effective three dimensional pattern that generates a depth less than the thickness of the continuous film.

* * * * *